(12) United States Patent
Brueckheimer et al.

(10) Patent No.: US 8,630,644 B2
(45) Date of Patent: Jan. 14, 2014

(54) CIRCUIT BEARER CONTROL

(75) Inventors: Simon Brueckheimer, London (GB);
Ian Domville, Wallingford (GB)

(73) Assignee: Apple Inc., Cupertino, CA (US)

( * ) Notice: Subject to any disclaimer, the term of this patent is extended or adjusted under 35 U.S.C. 154(b) by 693 days.

(21) Appl. No.: 11/531,865

(22) Filed: Sep. 14, 2006

(65) Prior Publication Data

US 2008/0070601 A1 Mar. 20, 2008

(51) Int. Cl.
*H04W 36/00* (2009.01)
*H04W 4/00* (2009.01)
*H04W 40/00* (2009.01)
*H04L 12/28* (2006.01)

(52) U.S. Cl.
USPC ........ 455/436; 455/466; 455/445; 455/432.1; 370/351

(58) Field of Classification Search
USPC .................................. 455/436, 466
See application file for complete search history.

(56) References Cited

U.S. PATENT DOCUMENTS

| | | | | |
|---|---|---|---|---|
| 2004/0266426 | A1* | 12/2004 | Marsh et al. | 455/426.2 |
| 2006/0025141 | A1* | 2/2006 | Marsh et al. | 455/445 |
| 2006/0089140 | A1* | 4/2006 | Zhang | 455/432.1 |
| 2006/0121894 | A1* | 6/2006 | Ganesan | 455/432.1 |
| 2006/0281474 | A1* | 12/2006 | Domville et al. | 455/466 |
| 2006/0286984 | A1* | 12/2006 | Bonner | 455/445 |
| 2007/0070976 | A1* | 3/2007 | Mussman et al. | 370/351 |
| 2007/0281704 | A1* | 12/2007 | Lin et al. | 455/445 |

FOREIGN PATENT DOCUMENTS

| | | |
|---|---|---|
| EP | 1385350 | 7/2002 |
| EP | 1442625 | 10/2002 |
| EP | 1528824 | 10/2003 |
| GB | 2370190 | 12/2000 |
| WO | 2004/082219 | 3/2004 |
| WO | 2004/088895 | 3/2004 |
| WO | 2005/006570 | 6/2004 |

* cited by examiner

*Primary Examiner* — Timothy Pham
(74) *Attorney, Agent, or Firm* — Meyertons, Hood, Kivlin, Kowert & Goetzel, P.C.

(57) ABSTRACT

The invention makes use of the Short Message Service (SMS) or Unstructured Supplementary Services Data (USSD) capabilities present in today's cellular networks as a means of providing call control and presence signalling and, in particular, for providing the means of effecting hand-off at least from/to the cellular domain to/from the WiFi domain. SMS and USSD were originally designed as engineering channels, but SMS has become highly popular as a service in its own right. SMS and USSD are built into all existing cellular (GSM, CDMA etc.) network and predate the current GPRS overlay. In particular, SMS and USSD can be used while a call may be active in the cellular domain, and a handset may send and receive such messages, with an additional facility which may be used by the invention of receiving acknowledgements of successful receipt of an outgoing SMS by the messaged party—effectively a confirmation from the network. The present invention proposes to use SMS or USSD as a means of an adjunct call control and presence signalling in the cellular domain between a handset and the SIP domain.

17 Claims, 7 Drawing Sheets

CIRCUIT BEARER CONTROL

FIELD

The present invention relates to methods, apparatus and systems for call control and for communicating call control signalling data in a radio access network.

BACKGROUND

The state-of-the-art in fixed mobile convergence (FMC) is the proposal to use WiFi IEEE 802.11 wireless access, in extension of the broadband fixed network, as an adjunct to cellular access. Several manufacturers have focussed on the implementation of so called Dual Transfer Mode (DTM) handsets, which incorporate both WiFi and cellular forms of wireless technology. There are also several voice and data service models envisaged to take advantage of the increased capacity WiFi can offer, as well as the extended coverage.

One principal aim of the DTM is to extend voice service capabilities to include VoIP from those handsets to use the WiFi access when it is in range, and to revert to normal cellular operation when not. The advantage of WiFi is that it is a relatively cheap technology that does not require a license to operate, and therefore it can have a wide range of ownership, such as Enterprises, residential as well as conventional fixed and cellular operators.

Several VoIP service models are possible. One model that is in standardisation by 3GPP is Unlicensed Mobile Access (UMA), in which WiFi access is controlled by a specialised gateway (UGW) that both controls the WiFi Access Points (infrastructure mode), the particular requirements for mobile hand-off between multiple adjacent access points as the handset moves, as well as providing a conventional appearance of a Base Station Controller (BSC) to the cellular network. In operation, UMA calls may thereby be handed-off between WiFi Access Points, as well as to/from the cellular network. UMA is a solution principally for Cellular Network operators (BSC emulation), although it could be conceivably owned by Enterprises and PTTs, this is less likely. The complete cellular voice service remains hosted by the cellular network and available over UMA using Voice over Internet Protocol (VoIP) between the DTM handset and the gateway (UGW). Cellular data service is also available in a manner that mimics the General Packet Radio Service (GPRS) access network, where the UGW behaves as a Serving GPRS Support Node (SGSN) to the cellular network.

A second model that provides voice service over WiFi combines the VoIP capability in the DTM handset with a Session Initiation Protocol (SIP) Client signalling capability; a SIP proxy server is then the complementary part of the network infrastructure. The SIP server can be owned by an Enterprise, PTT or a cellular operator in several variants of this model. Furthermore the SIP server could be IETF based or 3GPP IP Multimedia Subsystem (IMS) based. In any event, where the DTM handset is within WiFi coverage, the handset's SIP Client can signal the SIP proxy server to place calls to another similar user, or to the PSTN, PLMN or PBX extensions via media and signalling gateways. The WiFi Access Points are also controlled in a manner similar to (but independent of) UMA by a controller built at least to IEEE 802.11f standards, to provide handset mobility and to provide a seamless in-call hand-off between access points.

The difficulty with this second model though is that there is no standardised method of handing off a call between the WiFi and cellular access networks, although several have been proposed by the industry. One approach is to use the SIP server in the network to emulate the behaviour of an Mobile Switching Centre (MSC) with direct linkage to other real MSCs of the cellular network. This is analogous to the UMA model but taken up a level in the switching hierarchy, from the BSC to the MSC. While this may provide the means of natively signalling within the cellular network between the emulated and real MSCs to control WiFi and cellular hand-off, there are impositions on provisioning the cellular network to accept the new emulated MSC(s) and also the challenge of designing and executing a fairly complicated and non-standard SIP implementation of an MSC. The solution also remains restricted to working very closely with the cellular operator, although it is more readily owned by an Enterprise or PTT than UMA. Consequently this type of solution has not found much momentum in the industry.

A second approach to the second model is to federate the direct link between the SIP proxy server and the cellular network via a custom designed SIP Mobility Gateway (SMG). In this approach the DTM handset takes on the role of determining potential loss of the WiFi coverage and warns the SMG that it will attempt connection via the cellular network. The handset establishes a cellular hand-off call leg to any MSC associated with the geography, notifies the SMG, and the SMG hands-off the WiFi call leg by also signalling to the MSC to get it to join the two legs of the same call. Hand-off to the WiFi network from the cellular network is also possible, which again is initiated by the DTM handset and supported by the SMG. The cellular MSC is instructed by the SMG to hand-off the call to it, but the MSC remains in the call to provide this function and to be ready in case there is a reversion. Other variants are possible too. This second approach is similar to the first approach using a SIP emulated MSC, but since the special functionality is restricted to the SMG the SIP environment is less compromised than before. However, it still relies on the cellular network to provide hand-off control (MSC), and once the cellular network has been involved, even where the DTM handset moves (back) to the WiFi coverage domain, the cellular network remains in call. This could be very problematic in the situation where the handset was between cells served by two MSCs in the cellular network, where several hand-offs could result in entanglement of the call between the same MSCs and SMG repeatedly. For this reason and similar drawbacks of the first approach, this is not favoured.

A third approach is to incorporate the GPRS data access network in the cellular domain to provide a route for SIP Client signalling. The GPRS forms a (secure) signalling route between DTM handset and the SMG, and therefore avoids using specific MSCs or in principle any other particular infrastructure of the cellular domain. Signalling from the handset can use the SIP Client for both WiFi access and GPRS cellular domains back to the same administration's SMG. The advantage this has over the second approach is that hand-off between WiFi and cellular, whether initiated by the handset and/or the SMG, is performed using SIP to establish/release a call leg between the SMG and the handset through the cellular network, which may also pass through intervening PSTN. This approach neatly decouples any particular reliance on the cellular network infrastructure or signalling; the cellular network simply sees incoming call requests or their release enacted by the SMG or the handset. The only drawback of this method is that the SIP over GPRS must be able to be used simultaneously with the circuit based GSM voice which may be active on a call in many calling scenarios, e.g. transfer. While DTM handsets may soon be able to support simultaneous use of GPRS and GSM, the problem is that many cellular network Base Stations (BTS) do not yet have this capability, and which may only be around when cellular operators upgrade to 3G access.

A fourth approach recognises this delay in functionality to meet the present market demand for DTM. As a variant of the second approach it signals from the SMG using ISUP or PRI to the PSTN/PLMN to effectively transfer calls to/from cellular network when hand-off is required. The DTM handset instructs the SMG when WiFi coverage is being lost (or vice versa) and the SMG establishes or removes a call to the handset via the cellular network. In the case of WiFi to cellular hand-off the DTM handset recognises the incoming call as the hand-off call leg and seamlessly switches over. The reverse process of cellular to WiFi hand-off simply establishes a VoIP call leg with SIP instructing the SMG to perform a call release in the cellular network. This approach avoids the use of GPRS and of using the cellular network to manage hand-off on the MSC (between WiFi and cellular domains), making the SMG in all respects the controlling point. A restriction of this fourth approach is that to call a user of the service, he must be called at a number representing the SMG, and not on his mobile telephone number in the cellular network which would then bypass the SMG. However the user must have and retain a mobile telephone number so that the SMG can effect the call transfer.

This is not too great a disadvantage and simply means there is a special number for the user that works across the WiFI and cellular access. However, where that user is only within cellular coverage without a means to signal the SMG, when placing a call it will be routed by the cellular network without including the SMG in the end to end path which will mean hand-off cellular to WiFi is not possible unless the methods of one of the first three approaches above is also adopted. The calling line identifier (CLI) will also be that of the mobile telephone number, and not the special number working across WiFI and cellular, making returning any such calls problematic.

In all the above approaches the network SIP Proxy server and/or the SMG have the option to be linked to the Home Location Register (HLR) of a cellular network to determine Presence (e.g. availability, location) information for the user, whether they are registered on the WiFi and/or the cellular domains, and to infer the proper forwarding of any call.

The present invention aims to overcome the disadvantages of the above approaches of the second model and provides a means of effecting hand-off within WiFi coverage (multiple access points) and between WiFi and cellular domains.

SUMMARY OF THE INVENTION

In particular the preferred embodiment is an adaptation of the above third and fourth approaches, to implement the second model using a SIP signalling architecture that may for example be based on the IETF or the 3GPP IMS or ETSI TISPAN architectures using distributed control, with the addition of the functions of a SIP Mobility Applications server.

In one aspect, the invention makes use of the Short Message Service (SMS) capabilities present in today's cellular networks as a means of providing call control signalling and in particular for providing the means of effecting hand-off at least from/to the cellular domain to/from the WiFi domain. SMS was originally an engineering channel, but has become highly popular as a service in its own right, and is built into all existing cellular (GSM, CDMA etc.) network and predates the current GPRS overlay. In particular SMS can be used while a call may be active in the cellular domain, and a handset may send and receive such messages, with an additional facility which may be used by the invention of receiving acknowledgements of successful receipt of an outgoing SMS by the messaged party—effectively a confirmation from the network. The present invention proposes to use SMS as a means of an adjunct call control signalling in the cellular domain between a handset and the SIP domain.

In another aspect of the present invention the Unstructured Supplementary Services Data (USSD) channel of a GSM network in particular is used as a means of providing call control signalling and also for providing the means of effecting hand-off at least from/to the cellular domain to/from the WiFi domain. USSD channel may be used while a voice call is active in an analogous way to SMS. The main difference between USSD and SMS is that unlike the latter messages which by default are stored and forwarded and may incur some delay, albeit one which can be made relatively small, USSD is a session service that can support a sequence of messages, potentially in a bidirectional half-duplex manner. This confers some advantages over SMS in the embodiment of the present invention where the application is GSM networks. USSD uses the same character alphabet as SMS, so the same messages could be sent either way.

A further aspect of the present invention is the use of a suitable protocol conversion between SMS and SIP (or USSD and SIP) to signal between client and server in the network.

A further aspect of the present invention is to encapsulate in SMS (or USSD) SIP messages or a compressed form of SIP messages using such well known methods as ZIP or an abbreviated ASCII or other binary representation of SIP, or a segmented SIP message over a sequence of more than one SMS (or USSD) messages, processed by the client and the server.

A further aspect of the present invention is to use the SMS Message Service Centre (SMSC) to perform call control directly, or to act as a protocol converter, or to act as a Back to Back User Agent to reoriginate the SIP User Agent or Client on behalf of the SMS signalling between handset and SMSC.

A further aspect of the present invention is to use a USSD Gateway to perform call control directly, or to act as a protocol converter, or to act as a Back to Back User Agent to reoriginate the SIP User Agent or Client on behalf of the USSD signalling between handset and HLR.

A further aspect of the present invention is to use SMS (or USSD) signalling as a means of controlling supplementary services in the network such as call forward, call transfer, call waiting etc.

Further aspects and advantages of the present invention will be apparent from the following description and claims. There now follows, by way of example only, a detailed description of preferred embodiments of the present invention in which:—

DETAILED DESCRIPTION OF PREFERRED EMBODIMENTS

Figure 1:
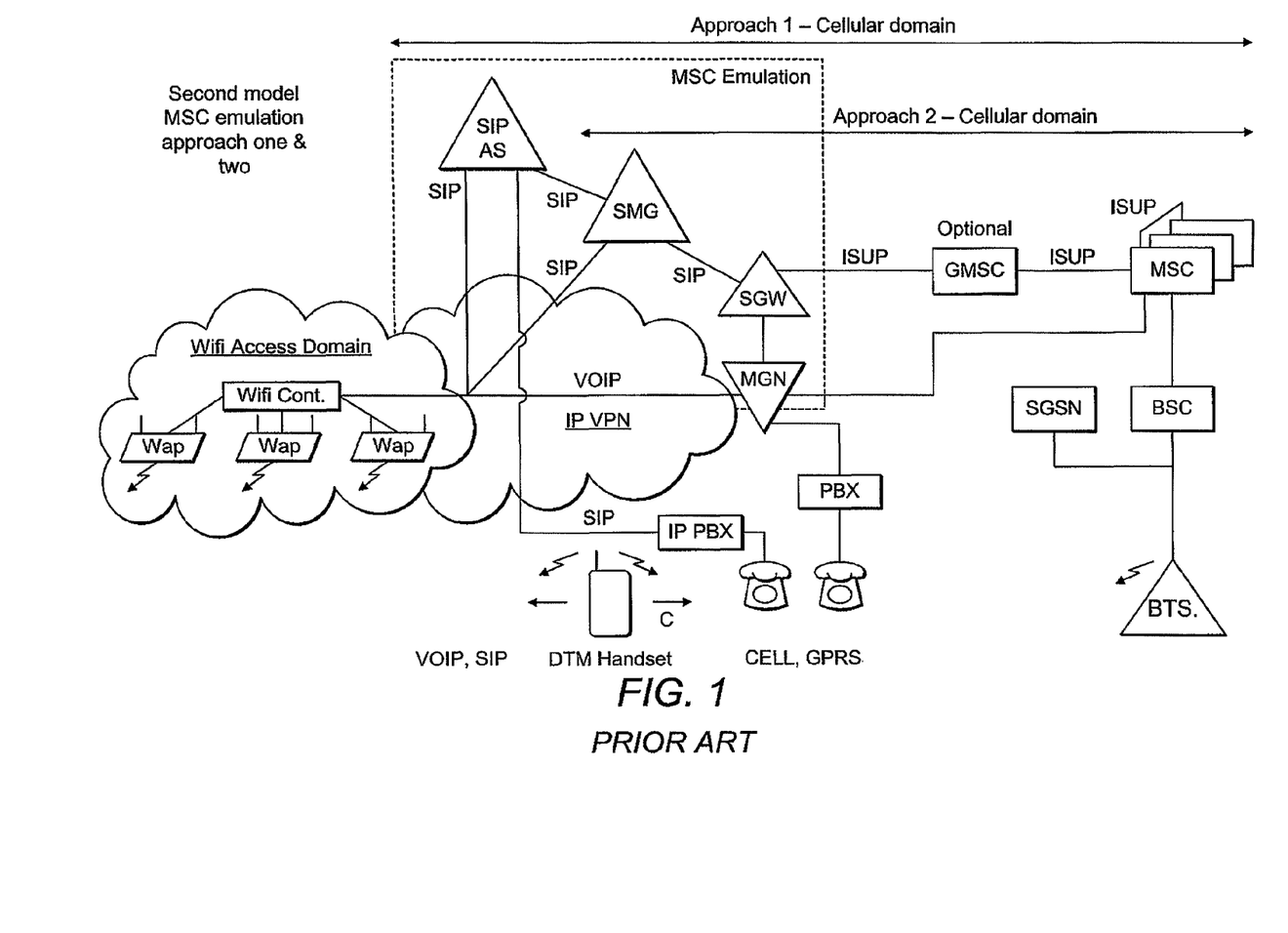
FIG. 1 shows communications in a network arrangement for implementing the first and second prior art approaches described above.
Figure 2:
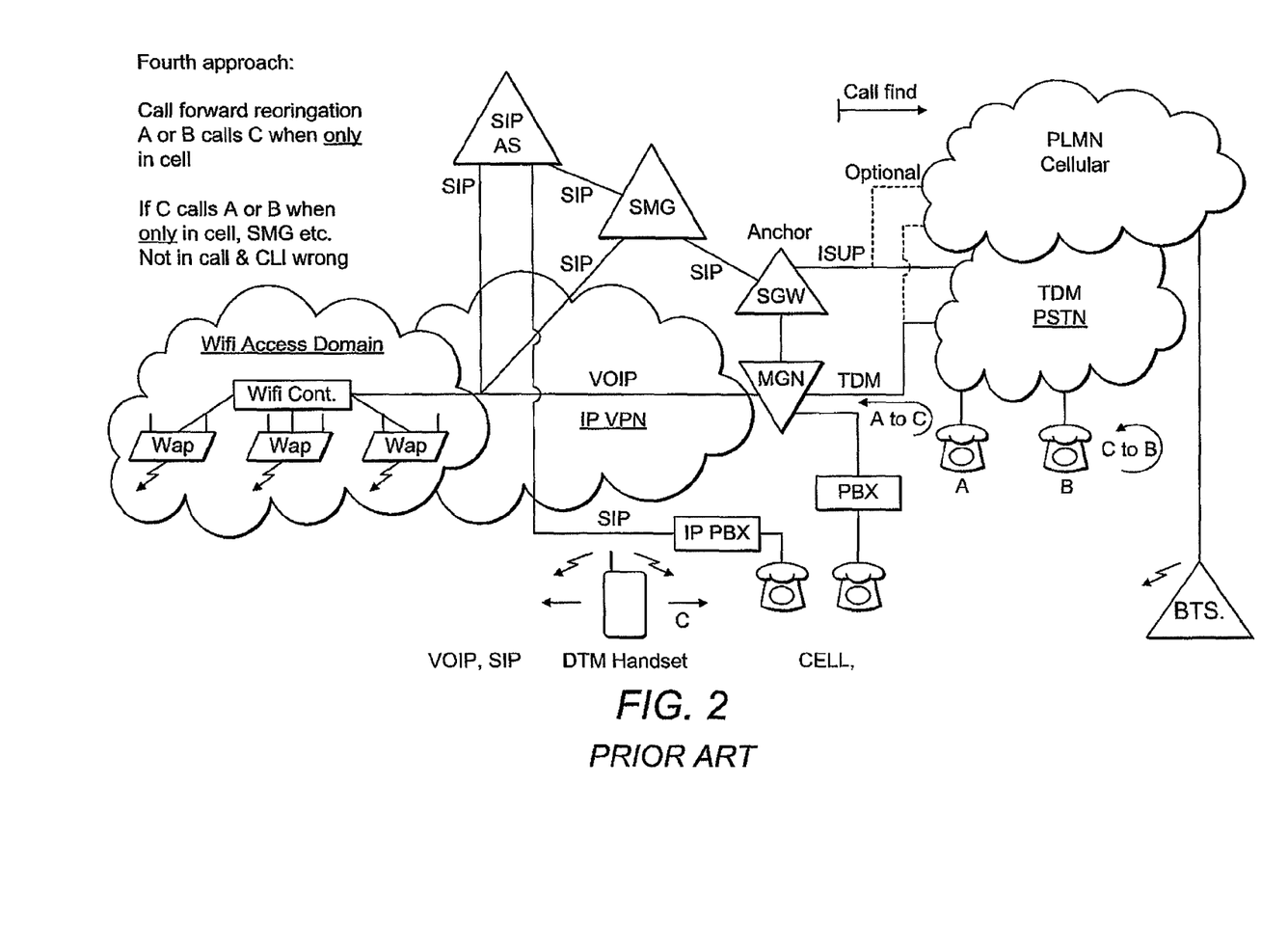
FIG. 2 shows communications in a network arrangement for implementing the fourth prior art approach described above.
Figure 3:
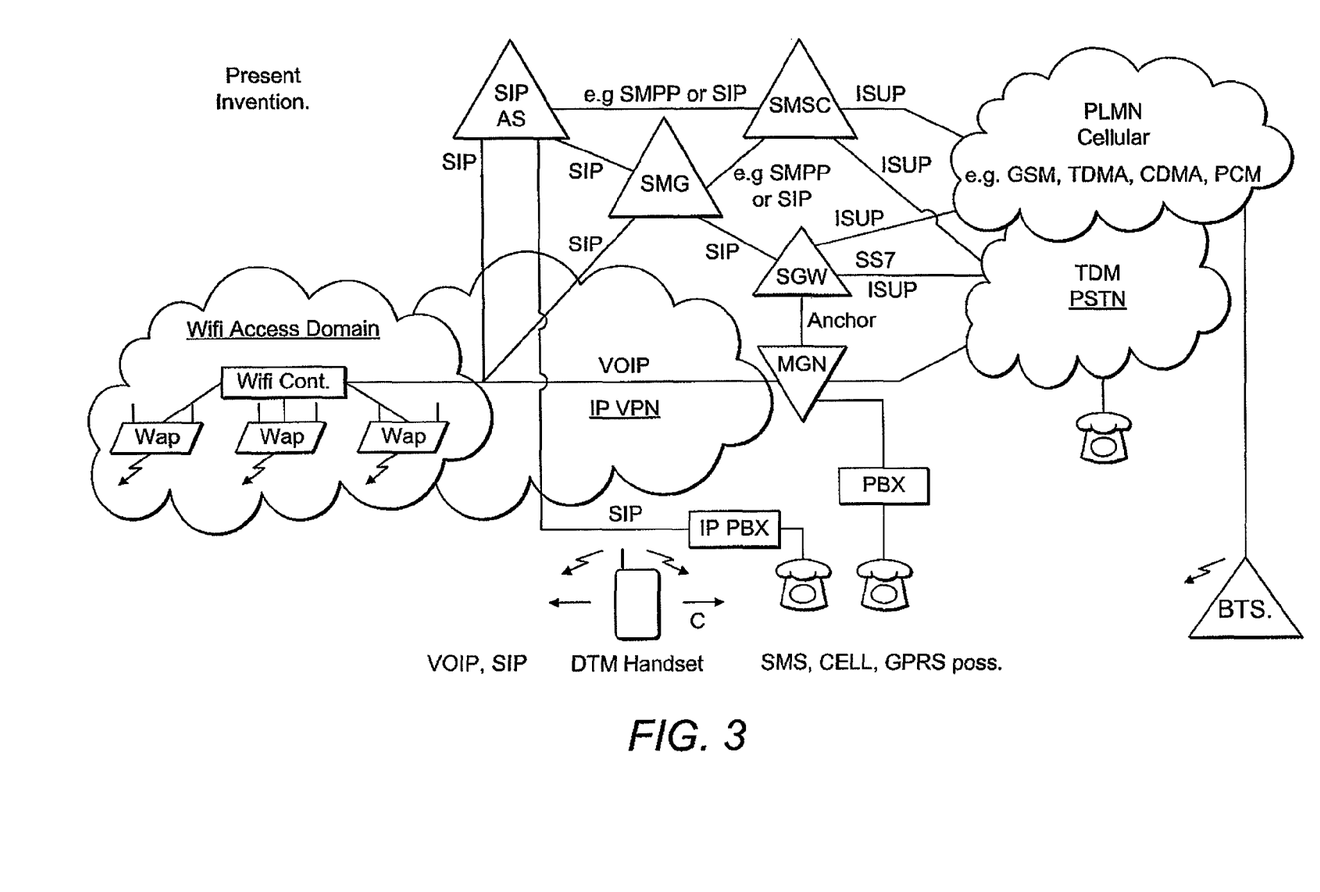
FIG. 3 shows communications in a network arrangement for implementing an embodiment of the present invention in which call control is effected over an SMS channel.
Figure 4:
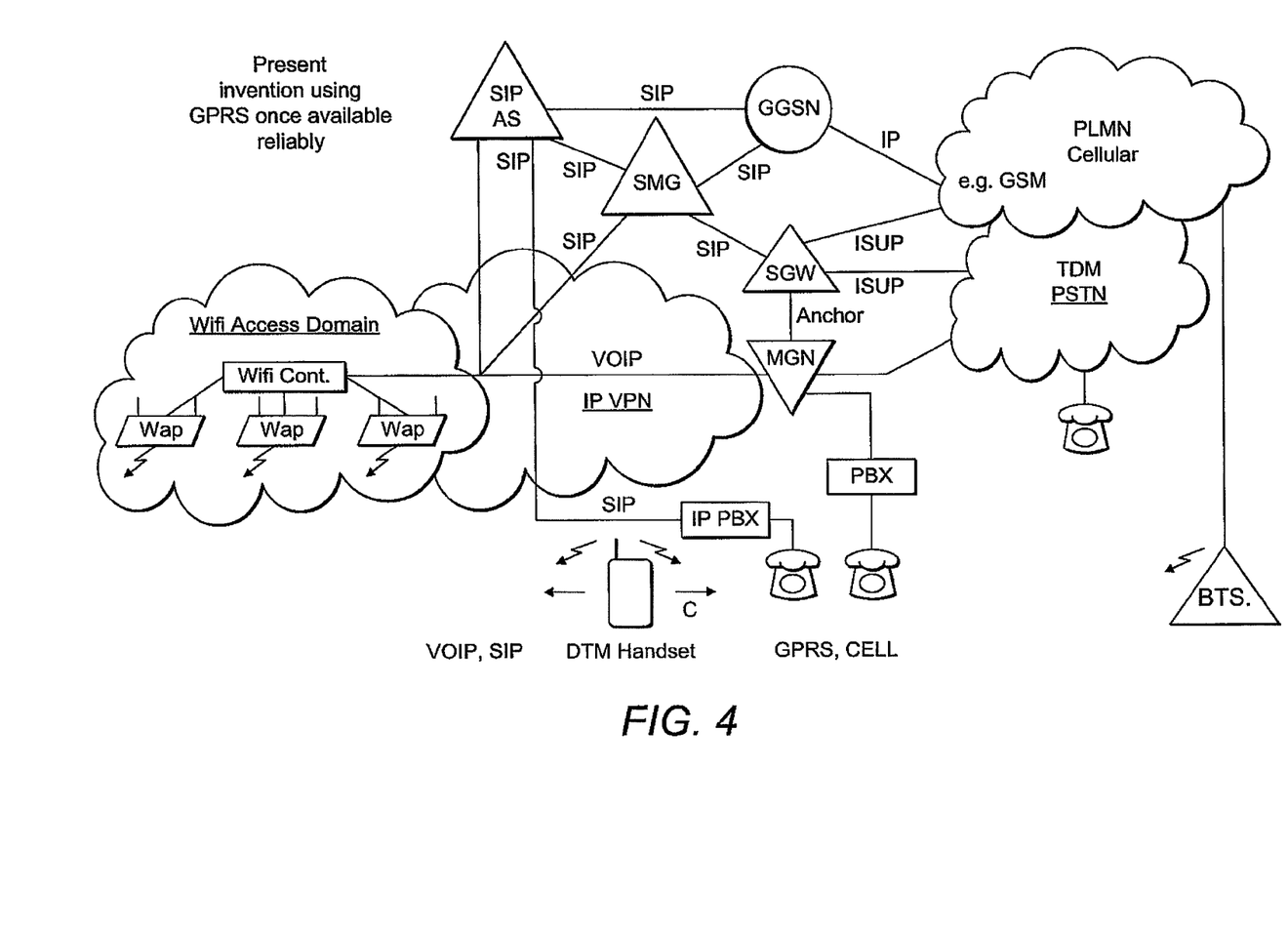
FIG. 4 shows communications in the network arrangement of FIG. 1 once a GPRS service is reliably available for call control signalling.
Figure 5:
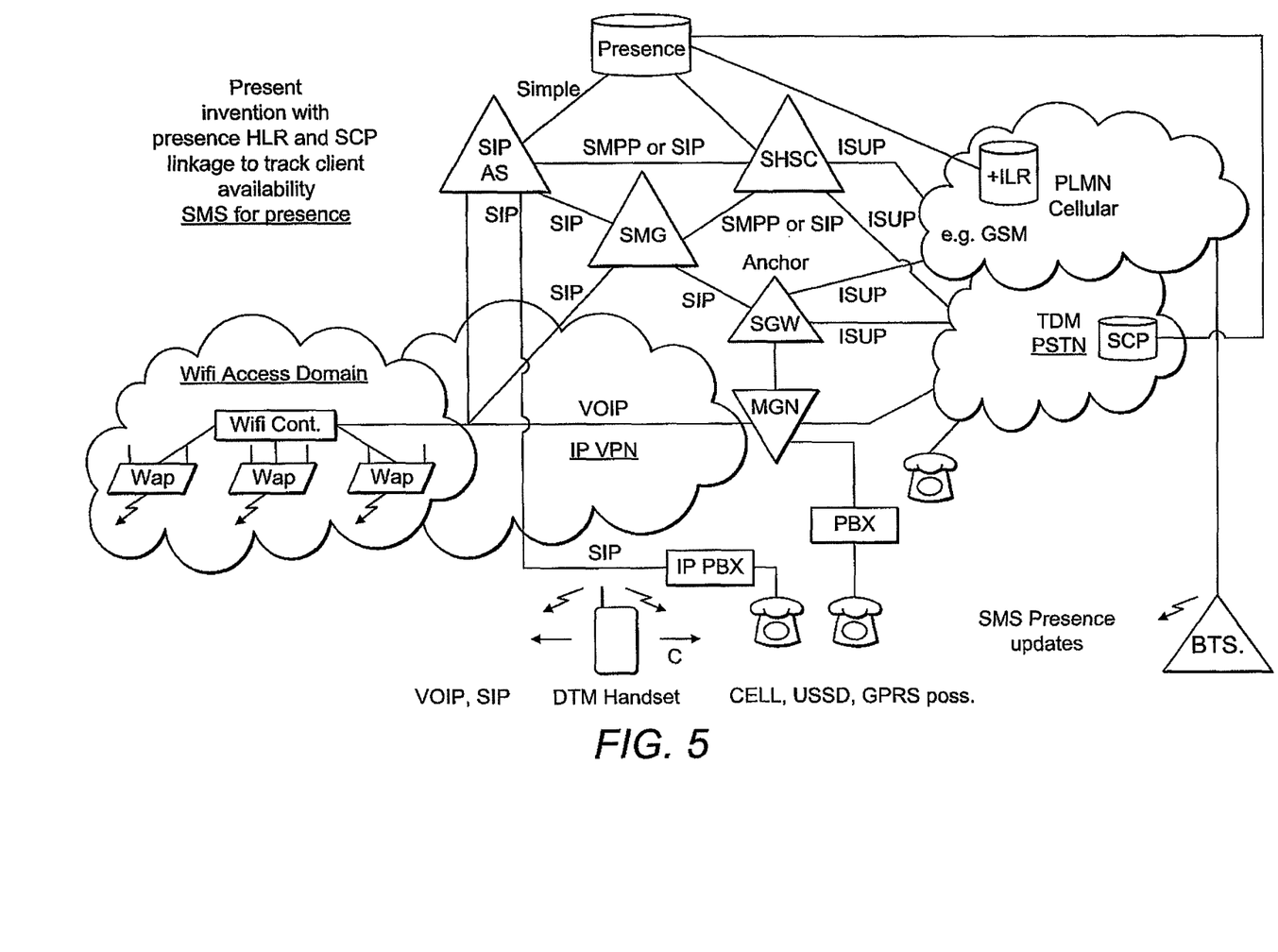
FIG. 5 shows communications in a network arrangement for implementing an embodiment of the present invention in which SMS is used for communication of presence information.
Figure 6:
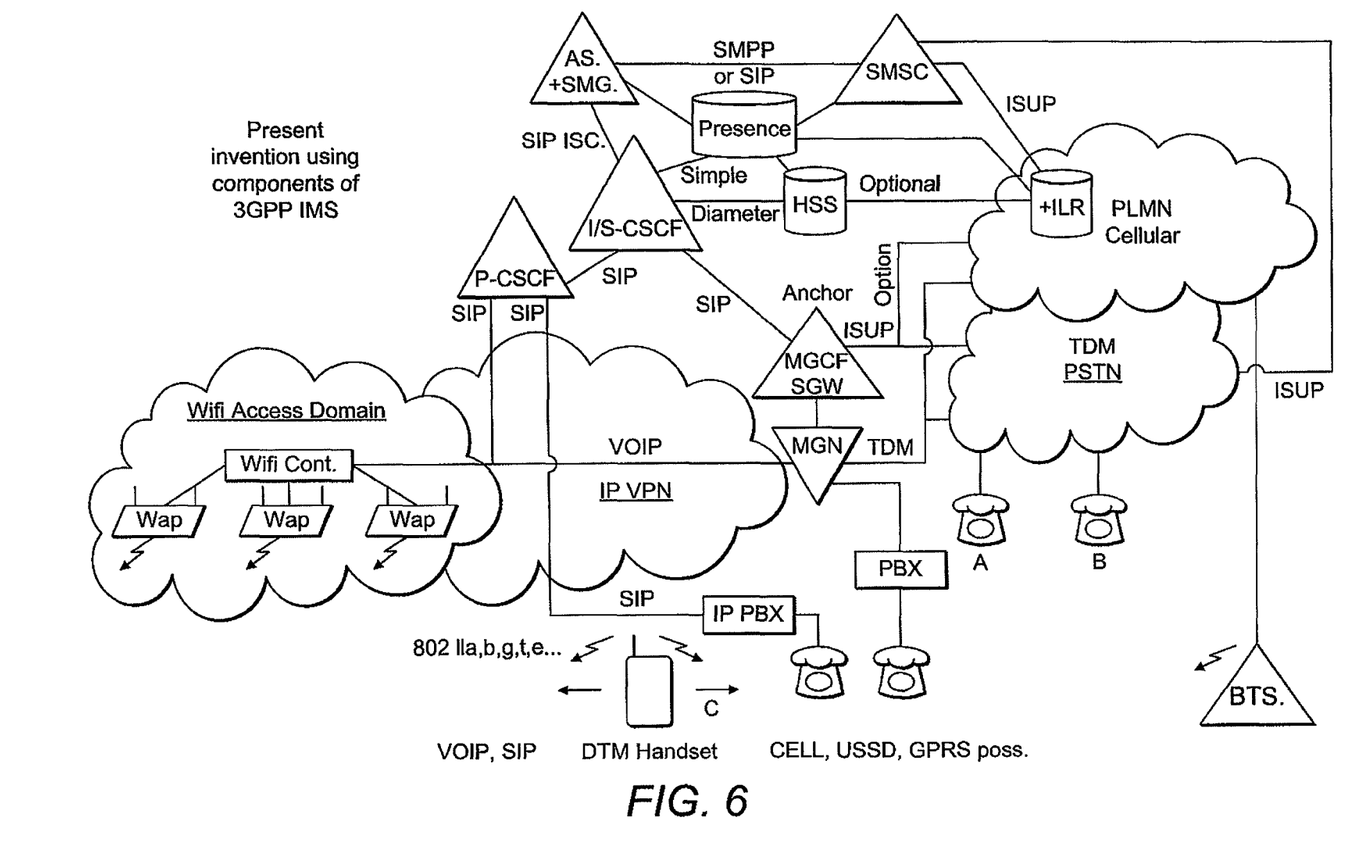
FIG. 6 shows communications in a network arrangement for implementing an embodiment of the present invention in which call control is effected over a USSD channel.
Figure 7:
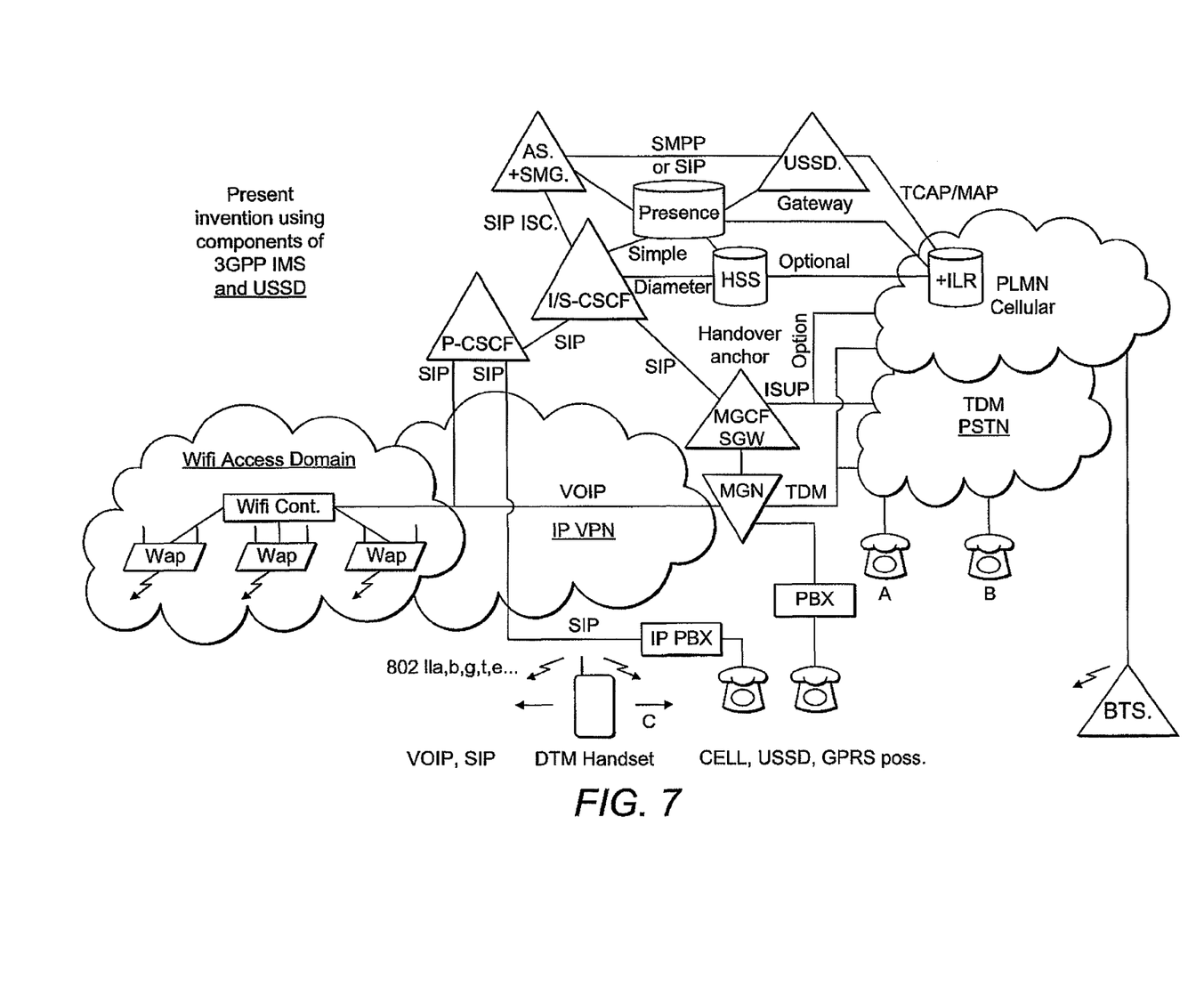
FIG. 7 show communication in a network arrangement for implementing one embodiment.

In cellular networks at present SMS is carried on ISDN Signalling User Part ISUP signalling on interfaces between MSCs and the SMSC, and MSCs and so called Gateway MSCs (GMSC) that interface to the PSTN where the SMSC is outside that cellular network, signalling ISUP over the SS7 network. The SMSC also has a Short Message Peer to Peer (SMPP) interface that allows communication between the SMSC and other application servers. SMS may also be delivered across fixed line networks such as the PSTN using ISUP. SMS addressing uses conventional telephone numbers for source through Calling Line Identifier (CLI) and destination, and optionally these may be translated by the Service Control Point (SCP) in an Intelligent Network (IN) network, such that the cellular and PSTN may suitably route the message to the mobile handset or fixed line respectively. The SMSC normally implements a store and forward model for message delivery, although this can occur extremely rapidly provided the destination is available. Where a mobile handset is not presently registered with a cellular network, the message is held in the SMSC until the Home Location Register (HLR) can record the current location of the mobile. Where the mobile is registered the message is delivered immediately within the constraints of normal processing delays. Furthermore the SMSC has the capability to send a message back to the originator acknowledging delivery of the SMS to the destination. Various options are available how long the message is held.

In GSM networks USSD is transported on Transaction Capability Application Part (TCAP), similarly to SMS on SS7 signalling, between the MSC currently serving the handset and the HLR associated with the subscriber. This communication from handset back to the HLR occurs whether the handset is in the "home" mobile network (the operator or their agent with whom the subscriber has a contract) or roaming in a visited (another operator's) network, provided the appropriate USSD service code is specified. In the case of the visited network, the HLR for the subscriber is identified by the SIM card in the handset and potentially the use of the CAMEL protocol (Customised Applications for Mobile Enhanced Logic). The HLR communicates with a USSD gateway using Mobile Application Part (MAP) on SS7, and the gateway may be standalone or combined with the Services Control Framework of the mobile network, or owned by another operator. The USSD gateway may be used in turn to communicate with other Applications Servers by SMPP, as per the SMSC, and several external Applications Servers may be distinguished by the service codes and filters used. USSD may be network or handset initiated which allows asynchronous events to occur from either end and a dialogue to ensue. Notwithstanding the difference between USSD and SMS of session based bidirectional messages versus store and forward respectively, those skilled in the art will appreciate that USSD may be substituted in every instance where SMS is mentioned in the following description without any loss of generality except the restriction to GSM networks. Similarly, the USSD gateway may be substituted for the SMSC in context to provide an interface to the Applications Layer.

In the first preferred embodiment of the present invention SMS is used to signal an SMSC to provide direct or act as a proxy for call control signalling. In particular the SMSC belongs to the administration hosting a SIP VoIP service. The administration could be an Enterprise, a Public Telegraph and Telephone (PTT) operators (PSTN) or a cellular operator for example. In the present invention the CLI (part of the ISUP or the SMS) and use of a number to be called, as well as any other information embedded in the SMS is used to effect call control signalling. This SMS can be intercepted by the SMSC (or even by the gateway en route to the SMSC) and the type of the message as call control signalling recognised for example by the SMSC number being used, an embedded code point, a form of digital signature based on information from the Subscriber Identification Module (SIM) card of the mobile phone for verification, authentication, non-repudiation or any other appropriate means, distinguishing it from a conventional SMS between users or other form of engineering SMS.

The preferred embodiment of the present invention is to implement the third approach to control WiFi and cellular hand-off using SMS instead of SIP over GPRS in the cellular domain. The network comprises a WiFi access domain and associated controller for WiFi access point handover, a SIP Mobility Gateway and Applications Server, an SMSC, and connectivity via gateways as appropriate to the Public Switched Telecommunications Network (PSTN), Enterprise Private Branch Exchange (PBX) and cellular access domain via the Public Land Module Network (PLMN). A DTM handset with VoIP and SIP clients may use the WiFi access domain to place VoIP calls using SIP signalling between equivalent users. The WiFi access point controller is used to ensure seamless hand-off between possibly multiple access points in the WiFi access domain. Where a call needs to be placed from the DTM handset to any other user of a PBX, PSTN or PLMN for example then the SIP Applications server will connect the VoIP to a Media Gateway (MGW) and associated Signalling Gateway (SGW) to exit the WiFi access domain. Similarly incoming calls from a PBX, PSTN or PLMN for example are directed via the MGW and an associated SGW by the numbering plan for the user to the SIP Applications Server which tracks the Presence (e.g. availability, location, registration) of the DTM handset and completes the call. If one now assumes the DTM handset is engaged on a call and in the WiFi access domain, the situation where the handset moves to the cellular domain is described assuming WiFi access to be preferred. Those skilled in the art will appreciate the same explanation would apply equally where the cellular network may be preferred, for example the placement and hand-off of emergency calls. As the DTM handset begins to lose signal strength of the WiFI access domain, it requests hand-off to the cellular domain by informing the SIP Mobility Gateway (SMG) using SIP over WiFi. However it is possible that the WiFi signal may fade too rapidly for this to be successfully effected which ordinarily causes loss of the signalling and voice paths. The present invention proposes that the SIP Client uses SMS to send this call control to the SMG, either natively by embedding the necessary information, by converting the SIP to SMS information, or by encapsulating the SIP with any necessary form of compression for example ZIP. Those skilled in the art will recognise that USSD may be used as an alternative. The SMS is transmitted from the DTM handset to the SMSC of the SIP network administrator ideally directly by using an appropriate SMSC number, although it is possible for this to be relayed or passed via gateways. In the simplest model the SMSC will recognise the SMS as call control and perform any necessary verification and forward the message natively using SMPP to the SMG. Those skilled in the art will appreciate that any appropriate communication protocol may be used between the SMSC and SMG, the SMSC can perform optionally direct protocol conversion to SIP, and those functions could also be combined into a single platform. The SMG will interpret the call control as a hand-off and establish a call leg through the cellular network (and PSTN if necessary) to the DTM handset. This call could be established in the cellular using an unpublished cellular Directory Number or any other means of identification of the user, e.g. International Mobile Subscriber Identify (IMSI) or Mobile Station Roaming Number (MSRN) which is ISUP routable depending on the relationship between the administration of the SMG and the cellular networks. The SMG may also send an acknowledgement back to the DTM handset that the call leg is established using SMS. The DTM handset client recognises the incoming call leg from the SMG via the CLI or SMS or both and switches the voice path from VoIP over WiFi to voice over cellular (e.g. GSM). Contemporaneously the SMG bridges the newly established call leg to the DTM handset with the call leg to the other party, and releases any redundant network resources representing the former VoIP over WiFi path.

Where the DTM handset moves from cellular coverage into the WiFi access domain, the signal strength of the WiFi can be measured and used to initiate hand-off. The DTM handset client may use SIP or SMS or both for this purpose depending on the circumstances, but for the purposes of illustrating the advantages of the present invention SMS is assumed. This also suits a situation where the cellular coverage and WiFi only barely overlap, and hand-off must be carefully controlled to allow possible reversion to cellular. The DTM handset sends an SMS call control to the SMSC and SMG as above to initiate the hand-off. The SMG responds by setting up the network resources to establish a VoIP call leg over the WiFi access domain, and may send an SMS acknowledgement. (SIP could equally be used for both purposes). Once the DTM handset has determined the VoIP call leg is operational, it can send an SMS over the cellular network to the SMG to release the call leg in the cellular domain after bridging the call leg to the other party to the newly establish VoIP call leg. Contemporaneously the DTM handset can switch to using the VoIP call leg or await an SMS or SIP acknowledgement from the SMG, or even simply release the cellular call leg.

Using SMS in this manner may also be used to solve the problem where the DTM handset is only within cellular coverage (not WiFi) and wishes to place a call. In order that the CLI represents the numbering plan associated with the SIP administration (or its delegate), the DTM handset client can initiate outgoing calls using SMS to the SMG and SIP Applications Server that places the call by proxy. The SMS would include the called party number, either translated or to be translated by the SIP Applications Server, and the CLI would be substituted with the appropriate numbering plan when the outgoing call leg is placed. The SIP Applications Server may also be used to establish the call leg back to the DTM handset through the cellular network (and any intervening PSTN) and send an SMS, or send the SMS acknowledgement and have the DTM handset establish the call leg to a particular number of the line in a hunt group on the media gateway bridging the two call legs. Using SMS in this manner ensures that should the DTM handset subsequently move into WiFi coverage, the call can be handed-off from cellular to WiFi as described before without leaving any resources used in the cellular network. This has advantage where the administration providing the user's service wishes to be independent of the cellular operator as much as possible, such as when the user is roaming.

SMS call control may also be used to effect supplementary services for example call transfer or three way calling. By way of example but with no restriction to this example alone, To place a three way call where the DTM handset is in the cellular domain and a call is active from the handset to another party, the client sends an SMS on the user's behalf to the SMG/SIP Applications Server as described before requesting it establish the third party call leg. On successful establishment the SMG/SIP Applications Server can bridge the call in a network media gateway and send an SMS acknowledgement. In a similar manner SMS may be used to release either party call leg. Call waiting, hold and forward may be implemented in the same way, as indeed can a complete set of supplementary services that mimic those of Centrex, PBXs and cellular networks in general using this ability to control call lags from the Application Server. The key advantage of this approach is that at most one call leg through the cellular network is required, and where the DTM handset moves into WiFi coverage or wishes to drop from a three way call or forward a call, no resources of the cellular network are required any longer than necessary.

SMS may also be used as a means for the user or DTM handset to send Presence updates for example on location and availability to the SIP Applications Server and/or a Presence server of the same administration. Additionally, call forwarding and screening preferences may also be updated in this manner while a call is in progress which may prevent accessing the same using SIP over GPRS.

Those skilled in the art will appreciate that other signalling systems than SIP may be used. Similarly the functions of call control, bridging, SIP applications, SMSC, USSD Gateway SMG, SGW, MGW, PBX may be combined in any combination or permutation in their physical realisation. Furthermore the applications and supplementary services may be hosted in the SIP domain as described or be part of a PBX, the PLMN or PSTN or any other network call control and invoked by the SIP network or its equivalent by proxy.

The invention claimed is:

1. In a radio access network system comprising a cellular domain and at least one WiFi domain, a method of call control comprising:
    using a Session Initiation Protocol (SIP) Applications Server to control a call, irrespective of whether the call is originated in the cellular domain or in the WiFi domain; and
    using a radio access network messaging channel of the cellular network to communicate call control signalling data to or from the SIP Applications Server when the call is originated in the cellular domain and when handover is required (1) between the cellular domain and the WiFi domain or (2) between the WiFi domain and the cellular domain;
    processing the call control signalling data to enable communication of the call control signalling data over a radio access network messaging channel, wherein the processing comprises converting at least part of the call control signalling data into a data transmission format of the radio access network messaging channel.

2. The method according to claim 1, wherein the radio access network messaging channel is a Short Message Service (SMS) channel.

3. The method according to claim 1, wherein the call control signalling data is Session Initiation Protocol (SIP) signalling data.

4. The method according to claim 1, wherein the call control signalling data is communicated to or from a mobile station of the radio access network system.

5. The method according to claim 1, wherein the call control signalling data is communicated to or from a mobility server of the radio access network system.

6. The method according to claim 1, wherein the processing comprises converting data in transmission format of the radio access network messaging channel into at least part of the call control signalling data.

7. The method according to claim 1, wherein the processing comprises encapsulating the call control signalling data into one or more message units of the radio access network messaging channel.

8. The method according to claim 1, wherein the processing comprises decapsulating one or more message units of the radio access network messaging channel to recover the call control signalling data.

9. The method according to claim 1, wherein the radio access network messaging channel is a Short Message Service (SMS) channel.

10. The method according to claim 1, wherein the call control signalling data is Session Initiation Protocol (SIP) signalling data.

11. The method according to claim 1, wherein the radio access network messaging channel is an Unstructured Supplementary Services Data (USSD) channel.

12. A mobile station, comprising:
communication circuitry, configured to perform wireless communication in a radio access network system comprising a cellular domain and at least one WiFi domain; and
processing hardware coupled to the communication circuitry, wherein the processing hardware and communication circuitry is configured to operate together to:
communicate with a Session Initiation Protocol (SIP) Application Server for controlling a call, irrespective of whether the call is originated in the cellular domain or in the WiFi domain;
wherein a radio access network messaging channel of a cellular network is used to communicate call control signalling data to or from the SIP Applications Server when the call is originated in the cellular domain and when handover is required (1) between the cellular domain and the WiFi domain or (2) between the WiFi domain and the cellular domain, wherein the call control signalling data is processed to enable communication of the call control signalling data over a radio access network messaging channel, wherein the processing comprises converting at least part of the call control signalling data into a data transmission format of the radio access network messaging channel.

13. The mobile station according to claim 12, wherein the radio access network messaging channel is an Unstructured Supplementary Services Data (USSD) channel.

14. A network node, comprising:
communication circuitry, configured to perform wireless communication in a radio access network system comprising a cellular domain and at least one WiFi domain; and
processing hardware coupled to the communication circuitry, wherein the processing hardware and communication circuitry is configured to operate together to:

use a Session Initiation Protocol (SIP) Applications Server to control a call, irrespective of whether the call is originated in the cellular domain or in the WiFi domain; and
communicate call control signalling data, using a radio access network messaging channel of the cellular network, to or from the SIP Applications Server when the call is originated in the cellular domain and when handover is required (1) between the cellular domain and the WiFi domain or (2) between the WiFi domain and the cellular domain;
wherein the call control signalling data is processed to enable communication of the call control signalling data over a radio access network messaging channel, wherein the processing comprises converting at least part of the call control signalling data into a data transmission format of the radio access network messaging channel.

15. A radio access network system, comprising:
a session initiation protocol (SIP) application server; and
one or more other nodes coupled to the SIP application server, wherein the one or more other nodes are configured to:
use the SIP Applications Server to control a call, irrespective of whether the call is originated in the cellular domain or in the WiFi domain; and
use a radio access network messaging channel of the cellular network to communicate call control signalling data to or from the SIP Applications Server when the call is originated in the cellular domain and when handover is required (1) between the cellular domain and the WiFi domain or (2) between the WiFi domain and the cellular domain;
process the call control signalling data to enable communication of the call control signalling data over a radio access network messaging channel, wherein the processing comprises converting at least part of the call control signalling data into a data transmission format of the radio access network messaging channel.

16. A non-transitory, computer accessible memory medium storing program instructions for performing call control in a radio access network system comprising a cellular domain and at least one WiFi domain, wherein the program instructions are executable by at least one processor to:
use a Session Initiation Protocol (SIP) Applications Server to control a call, irrespective of whether the call is originated in the cellular domain or in the WiFi domain;
use a radio access network messaging channel of the cellular network to communicate call control signalling data to or from the SIP Applications Server when the call is originated in the cellular domain and when handover is required (1) between the cellular domain and the WiFi domain or (2) between the WiFi domain and the cellular domain; and
process the call control signalling data to enable communication of the call control signalling data over a radio access network messaging channel, wherein the processing comprises converting at least part of the call control signalling data into a data transmission format of the radio access network messaging channel.

17. The non-transitory, computer accessible memory medium according to claim 16, wherein the radio access network messaging channel is an Unstructured Supplementary Services Data (USSD) channel.

* * * * *